United States Patent [19]

Cheung

[11] Patent Number: 5,736,976

[45] Date of Patent: Apr. 7, 1998

[54] COMPUTER DATA ENTRY APPARATUS WITH HAND MOTION SENSING AND MONITORING

[76] Inventor: Nina T. Cheung, P.O. Box 20461, San Jose, Calif. 95160

[21] Appl. No.: 389,931

[22] Filed: Feb. 13, 1995

[51] Int. Cl.⁶ ............................................. G09G 3/03
[52] U.S. Cl. ................... 345/168; 345/170; 345/172; 345/158; 341/22; 341/23; 382/48
[58] Field of Search ............................ 345/168, 170, 345/172, 158; 341/22, 23; 382/48

[56] References Cited

U.S. PATENT DOCUMENTS

| | | | |
|---|---|---|---|
| 4,880,969 | 11/1989 | Lawrie | 345/170 |
| 4,988,981 | 1/1991 | Zimmerman et al. | 345/158 |
| 5,034,602 | 7/1991 | Garcia, Jr. et al. | 345/170 |
| 5,168,531 | 12/1992 | Sigel | 382/48 |
| 5,367,298 | 11/1994 | Axthelm | 341/22 |
| 5,477,223 | 12/1995 | Destremps | 345/170 |
| 5,577,848 | 11/1996 | Bowen | 345/157 |

*Primary Examiner*—Richard Hjerpe
*Assistant Examiner*—Joseph J. Acosta

[57] ABSTRACT

The present invention is described as a computer data entry apparatus having a keyboard comprised of a keypad assembly and equipped with one or multiple motion sensing devices, and having a motion monitoring visual aid display. The motion sensing device is included to the apparatus to detect and sense the motion of operator finger locations before or after keys are actuated for data entry. A map with a keypad layout and sensed finger locations is interactively generated and displayed on a window of the computer display screen to provide the data entry visual aid. The combined function of motion sensing and visual aid displaying advantageously constitutes an easy operation computer data entry apparatus or system.

18 Claims, 6 Drawing Sheets

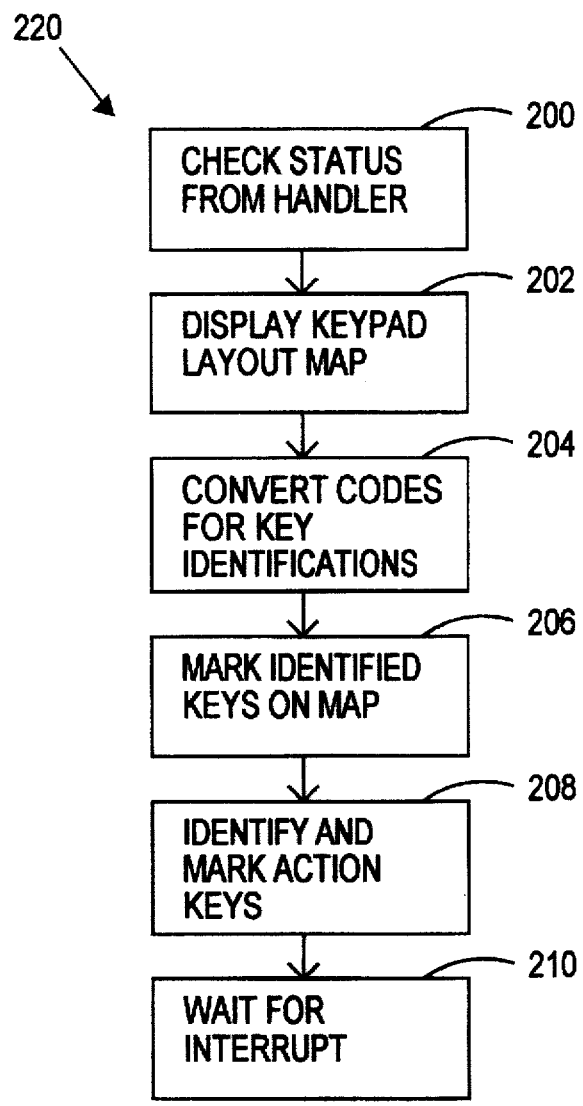

COMPUTER DATA ENTRY APPARATUS WITH HAND MOTION SENSING AND MONITORING

FIELD OF THE INVENTION

The present invention relates generally to data entry apparatuses for computers including other forms of information processors, and particularly to manual operation data entry keyboards.

BACKGROUND OF THE INVENTION

The keyboards are typically designed with an assembly of keypad, a keyboard processor, key stroke detection circuits, and interface hardware. The vertical mechanical key stroke actions are detected and encoded as key stroke data which are transferred to the computer processor through the interface hardware for processing. These conventional keyboards originate from the typewriter concept designed for use by serious typists. The operation of a keyboard manually often requires a proper seated position with intensive neck and hand motions which many users blame as causes of back, neck, and hand problems. The problem also remain in some new keyboards with an extendable keypad assembly that relieves some tension of shoulder and hand positions of the operator but are still designed mainly for touching typists. Though advances in technology have led to a rapid increase of computer users, most of them are not serious typists, and many are "hunt-and-peck" typists. This suggests that new design concepts are still needed to improve the keyboard technology and provide a more relaxing operational position as well as less intensive motions for many computer users.

SUMMARY OF THE INVENTION

In accordance with the present invention, a data entry apparatus includes a conventional keypad assembly with key pads and key caps, key stroke detectors, a keyboard processor, interface hardware, programmed codes, hand motion sensors and circuits, and an associated hand motion monitoring visual aid display. The hand motion detection sensors and circuits are designed in conjunction with the keyboard assembly hardware to detect operator hand motions which are motions of fingers on top of individual key caps before or after activation of a key stroke detection. For the purposes of the present invention, "motion" includes lateral as well as vertical hand movements by a user. Motion detection sensors including types of low cost object sensing, field responsive devices, and image catching camera or device may be adequately applied to the invention. The electrical detection signal or pulse for identification of hand motions on top of the key caps is generated by the sensor detection circuit and provided through an accessory interface or multiplexed with the key stroke data interface to the computer. A visual map represented by graphic symbols or color is produced and displayed with operator finger or hand locations plus a keypad layout diagram for monitoring of the finger and hand motions. When the map is displayed within or next to the computer display screen, the apparatus provides reduced actions required by the operator to move his focus between the keypad and the screen, and allows him to sit back and position the keyboard within a comfortable distance of the computer screen.

The hand motion detection and visual monitoring function also allow a compact keyboard assembly for further improvement of keyboard operational position by users with a single hand operation keyboard structure. By taking advantage of the monitoring visual aid display with keypad layout and key definition characters and symbols, the keyboard can be simplified with reduced keys for a compact structure. The new keyboard is designed with a set of row keys of designated symbols or characters for operation of a single hand, and a second set of keys which are side displaceable side keys for thumb operation. The row keys are assembled on top of the keyboard case or base with the main structure and the side keys are located in an assembly connected to the side of the main structure. In operation, the side keys can be multiplexed with row keys to change the representation of row keys for two or more sets of characters, symbols, or functions.

Briefly, this invention has been developed to provide an applicable solution with hand motion detection and a motion visual monitoring aid for data entry operation for computer and data processor users and to allow a more flexible operational position to ease their neck and hand motions.

Therefore, it is an object of the present invention to provide an improvement in data entry keyboards.

It is a further object of the invention to provide an improvement in data entry keyboards which includes finger motion detection devices and circuits.

It is still another object of the invention to provide an improvement for data entry keyboards with an interactive finger or hand motion display.

It is a further object of the invention to provide a combined function of finger or hand motion detection and motion monitoring display for easy positioning and operating of a data entry apparatus and reducing repetitive stress and motion required by the hand and the neck of the users.

And it is still yet another object of the invention to provide a single hand operational compact keyboard structure which allows a more relaxing operation and position for computer data entry.

Other features and advantages of the present invention should be apparent from the description of the following two preferred embodiments, which illustrate, by way of example, the principles of the invention. A first embodiment provides motion sensors, sensing circuits, and an interactive finger motion monitoring function with a conventional type keyboard assembly. A second embodiment provides an improved keyboard assembly with motion detection and monitoring especially designed for a single hand operation of computer data entry.

BRIEF DESCRIPTION OF THE DRAWINGS

FIG. 5a shows operation steps of the keyboard control program with motion monitoring function.

DETAILED DESCRIPTION OF PREFERRED EMBODIMENTS

Figure 1:
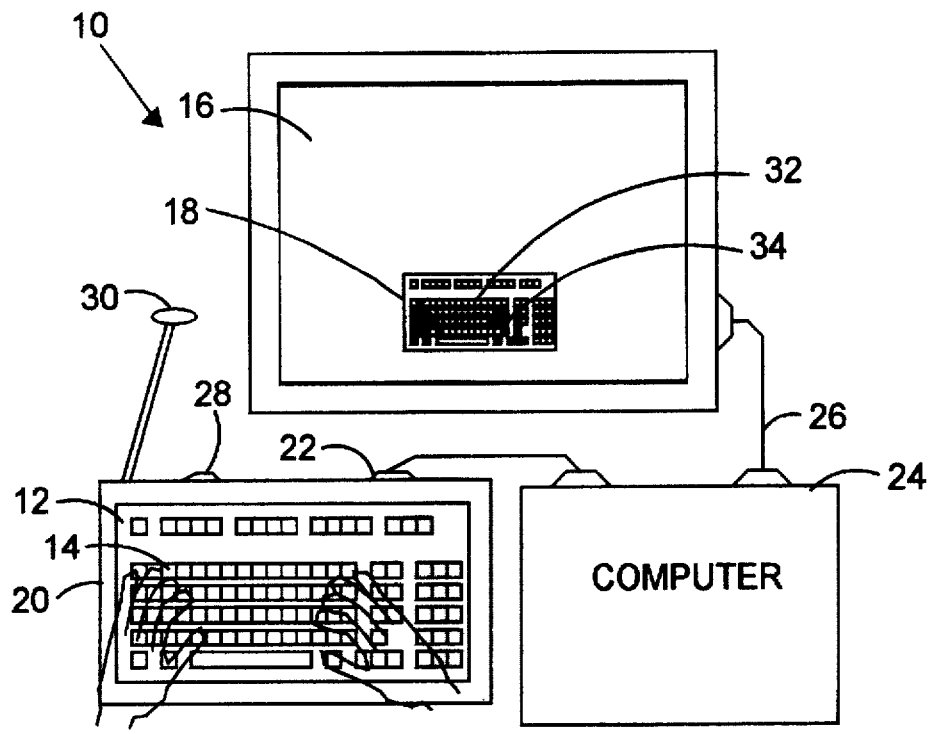
FIG. 1 illustrates a data entry apparatus comprising of a keyboard equipped with motion detection sensor and a hand motion monitoring display.

Referring now to the drawings and more particularly to FIG. 1, a first embodiment of the easy operation data entry apparatus 10 with hand motion detection and a motion monitoring display is shown. The apparatus 10 implemented in accordance with this invention includes a keyboard 20 with a keypad assembly and its case 12 equipped with key caps such as key cap 14 with embedded motion sensors, and a hand motion monitoring screen 16 providing a motion visual aid map 18. Map 18 includes a graphic of keypad layout 32 and marked key symbols 34 representing a motion and proximity or position of user fingers on top of key caps. Keyboard 20 is connected with an interface cable or port 22 to a computer 24. Computer 24 is also connected to screen 16 through a cable or port 26. Attached to keyboard 20 is a resistive thumb-wheel 28 for adjustment of motion detection sensitivity, also an optional is an electrical light and its support 30 for providing an additional light field source to aid motion detection.

It can be understood without further explaining, when a camera is used for hand motion sensing or scanning, key cap 14 dose not have to include a motion sensor. The camera is then employed in place of light and support 30 and scanned image can be directed to computer for motion image display and monitoring through an electrical interface. The following description is mainly focused on an implementation with motion sensors included with the key caps.

Figure 2A:
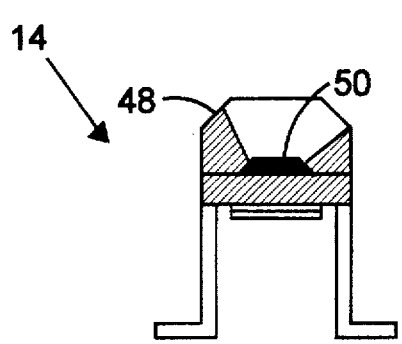
FIG. 2a shows a photo sensor housed under a key cap.
Figure 2B:
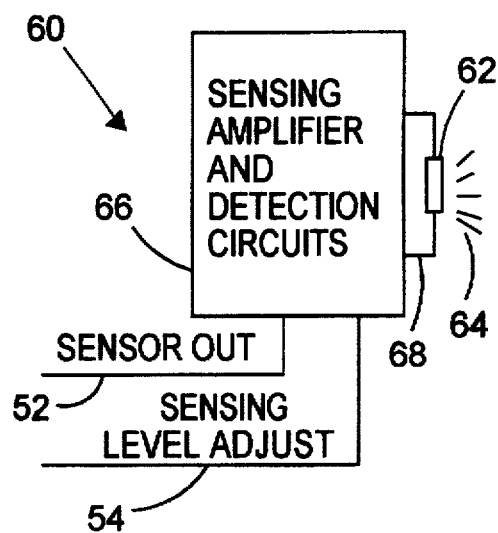
FIG. 2b shows a circuit functional diagram of photo sensor detection and connection.

The motion detection module 50 shown in FIG. 2a is a photo light sensor and detector housed under a clear plastic key top 48 of key cap 14. The light detection circuit 60, shown in FIG. 2b, is included with a sensing element 62 within module 50 with a sensor output line 52 and a light detection sensitivity adjustment line 54. Sensing element 62 converts the light field from a light path 64 to become an electrical signal 68. Signal 68 is amplified and compared by an amplifier and detection circuit 66 with a sensing level threshold which is set by line 54. As a finger or hand of the operator blocks off part of light path 64, the light field intensity received by sensor element 62 decreases to the set threshold, output line 52 is then activated and electrically signals an object's motion or proximity on key top 48. Line 52 as well as lines from other keys are sent to a keyboard controller for further processing. Since some large key caps may require more than one motion detection module, an electrical "OR" connection of the multiple sensors within the key cap, which is not shown, may be needed to provide a sharing of the input and output lines for the key.

Figure 3A:
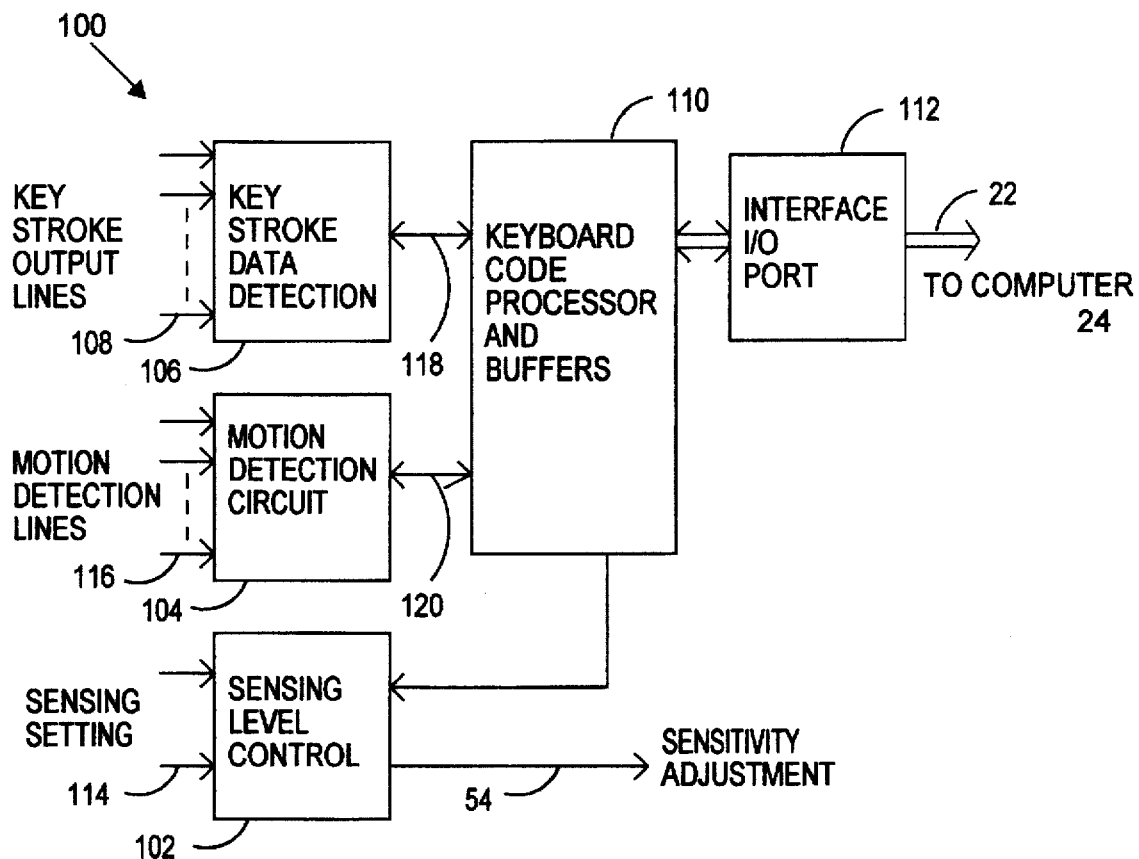
FIG. 3a illustrates controller circuits and functions of a keyboard with motion sensing and detection.

The keyboard controller 100 diagram is displayed in FIG. 3a, which shows a sensing level control circuit 102, a motion sensing detection circuit 104, a conventional key stroke detection circuit 106, a keyboard code processor 110, and a computer interface circuit 112. Circuit 102 receives a setting signal 114 from thumb-wheel 28 (see FIG. 1) and outputs line 54 to all motion detection modules, such as module 50 (see FIG. 2a). Detection output lines 116 generated from modules of all the keys, such as line 52 (see FIG. 2b), are connected to circuit 104. Keystroke data detection lines 108 are connected to circuit 106. Processor 110 processes keystroke detection data 118 as a set of scan code defined conventionally for normal keystroke actions, and also processes motion detection data 120 from circuit 104 as a second set of scan code. The first and second set of scan codes are encoded and processed in a conventional manner as the regular keystroke scan codes. It can be understood by those skilled in the art that the second set of scan codes can be also defined as extended keyboard codes or stored in separate data buffers or ports by processor 110. For this example, the communication of two sets of scan code to computer 24 are multiplexed through port 22 connected to circuit 112.

Figure 3B:
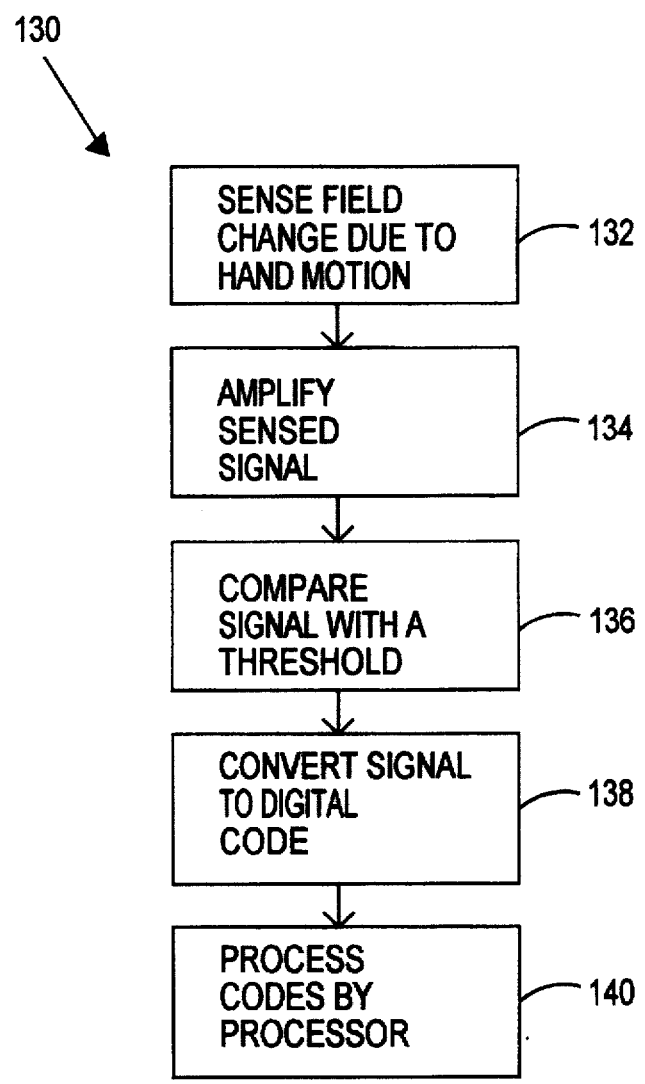
FIG. 3b shows operational steps for hand motion sensing and detection.

The operation of the hand motion sensing and detection can be seen in FIG. 3b which illustrates a series of steps of 130. First, step 132 senses a field change caused by motion or proximity of fingers on top of one or multiple key caps by sensing element 62 within each key caps. Next, step 134 amplifies sensed signal. Then, step 136 compares amplified signal with a threshold setting and converts the signal to a digital level for encodement. Finally, step 140 processes the encoded signals by processor 110 and delivers them to computer 24 through port 22 (see FIG. 1).

Figure 4:
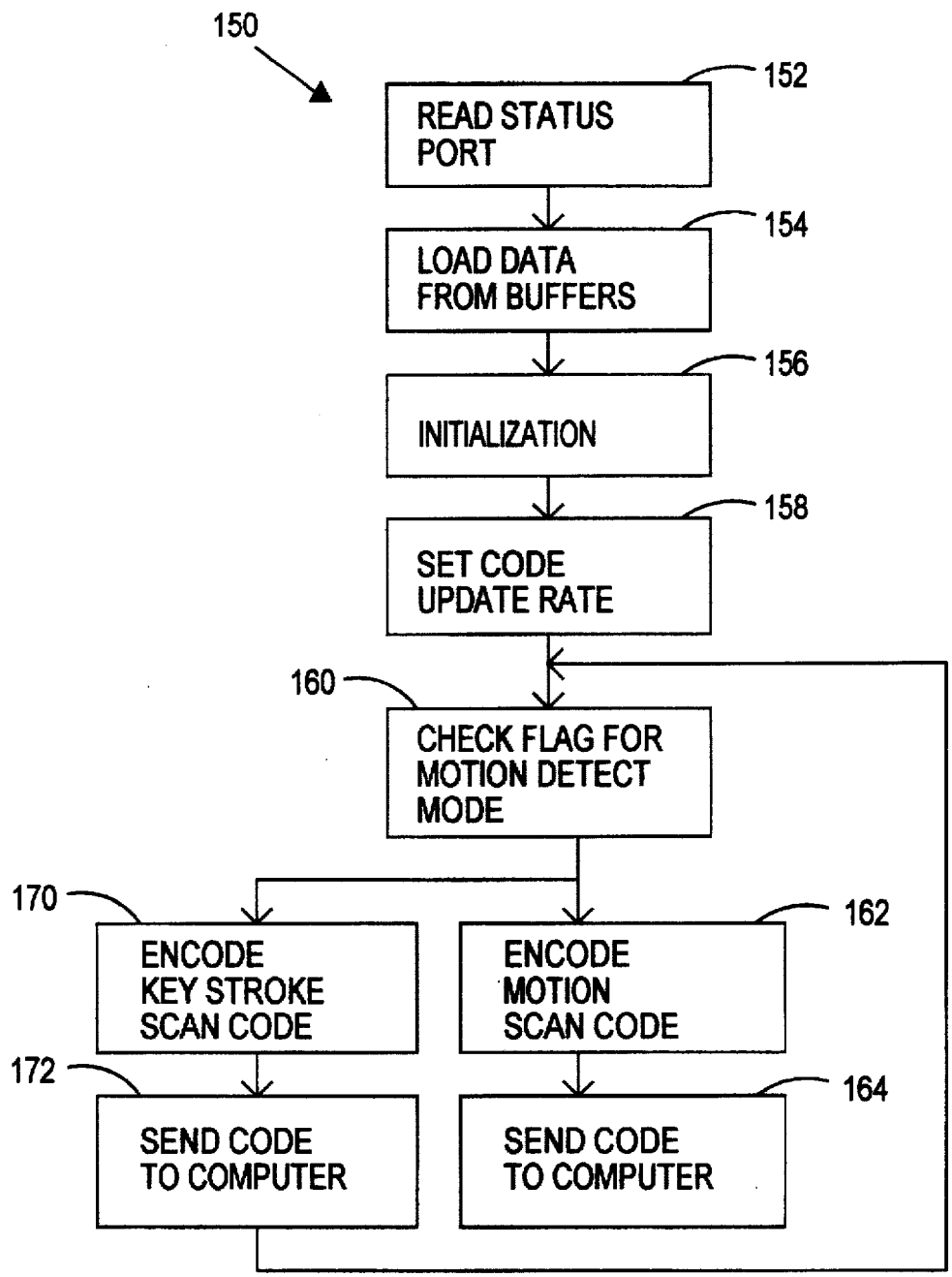
FIG. 4 shows a sequence of typical functional steps processed by the keyboard processor.

More detail functional steps processed by processor 110 are illustrated in FIG. 4. In step 152, processor t10 starts a process by reading a keyboard status port. It also loads in data from data buffers in step 154. After an initialization of step 156, it completes a setup for typematic rate defined as a typing repeat rate or keyboard delay rate. It also determines a motion detection scan code updating rate for turning on and off a motion detection flag bit in the step 158. Step 160 checks the motion detection flag for processing the motion detection pulses and signals. Step 162 receives and encodes the motion detection pulses generated from the sensing element and motion detection circuits as scan codes. The scan codes for motion can be sent in step 164 between a set of consecutive scan codes representing a special key code or a hot key keystroke code. As shown in here, the hot key can be set as key "F10". The activation of the hot key by the user also turns on and off a motion detection keyboard operation mode. The normal keystroke encoding and data transferring is processed in steps 170 and 172.

Figure 5B:
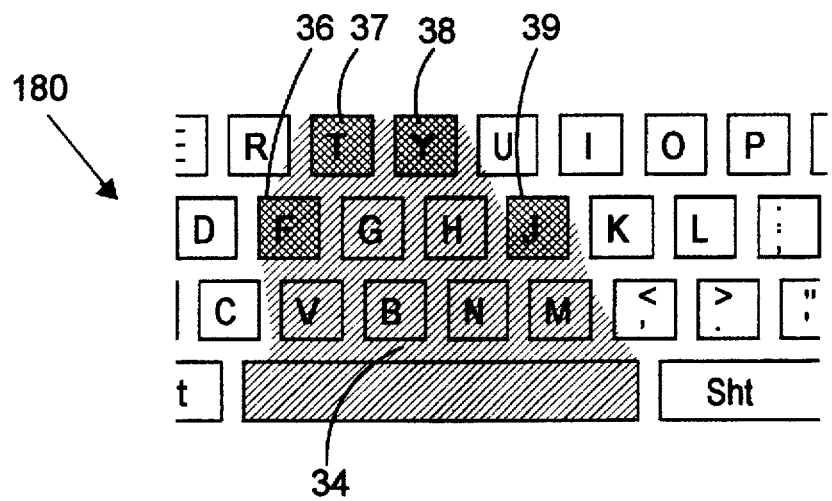
FIG. 5b displays a section of keyboard data entry monitoring visual map.

The program of generating an interactive hand motion map 18 is stored in computer 24. The steps of the control program 220, in the illustrated embodiment, can be seen in FIG. 5a. The program, in step 200, communicates with a keyboard handler program in the computer to recognize the motion detection scan codes between the consecutive hot key keystroke codes, and to store them in a series buffer. Step 202 generates map 18 of keypad layout to display within a window on the lower section of screen 16 with key definition symbols. A map 180 of a section of enlarged map 18 is shown in FIG. 5b. Step 204 converts the bufferred motion detection scan codes for key identifications. The identified keys 34 are marked as shown on section map 180 in step 206. A special color is also provided in step 208 by the program for the marked keys 36, 37, 38, and 39 which are closer to the top edge of the keyboard in each column sections defined as finger action keys. When map 18 is generated within a personal computer window operating platform, it would be easily arranged and placed in a desired window or location for convenient user viewing. Control program 220 is activated by a detection of the hot key and becomes a resident program. An interactive update sequence for map 18 can be repeated after a detection of an interrupt request by the modified keyboard handler with consecutive hot key codes.

Figure 6:
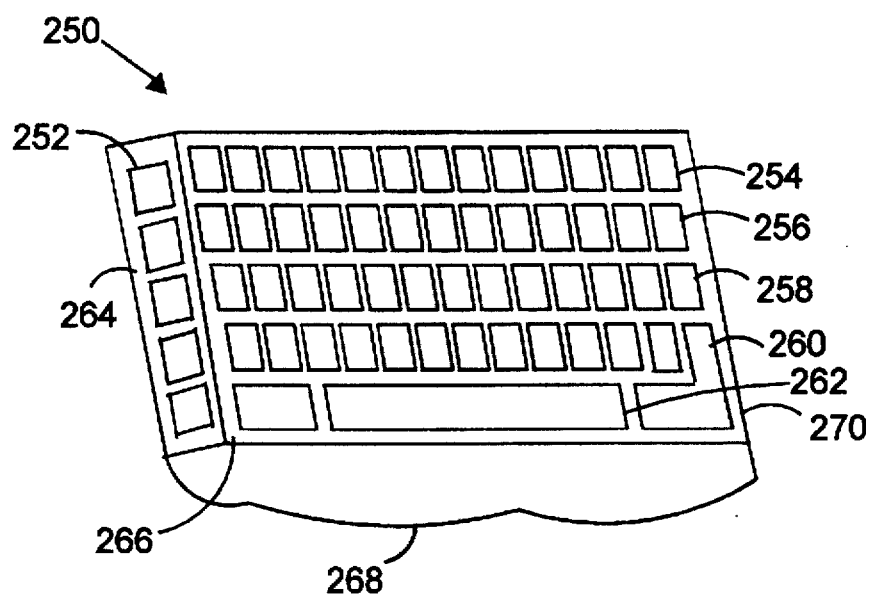
FIG. 6 shows a diagram of a single hand operation keyboard structure.

A second embodiment of the invention includes a compact keypad assembly, shown in FIG. 6, of a computer keyboard which is suitable for a single hand operation. The new keyboard structure provides flexibility and reduced keys for operation of data entry with the motion detection and monitoring functions as described in the previous embodiment. The single hand operation keyboard 250 includes a set of row keys in finger tip sized and arranged in main keycap surface 266 with key rows 254 through 262 on a compact structure of keyboard case 270 for reducing required hand motions. The second set of keys are side keys 252 which are side displaceable and mounted on an assembly with a side surface 264 connected to the side of the main structure of case 270. Side keys 252 are in thumb tip sized and defined as function keys, such as for "shift", "control" and "cap lock", especially for thumb operation. Attached to the front side of case 270 is a wrist rest pad 268 for minimizing tension required by the wrist.

The keypad assembly is laid out in a conventional QWERTY typewriter character pattern, with additional function and symbol keys defined by the combination pressing of one of the side keys 252 and the row keys 254 and 256. The row keys of left half keyboard can be also defined or programmed as a calculator keypad keys. Operation of these keys with multiple definitions by the user is assisted by the on-screen monitoring display with defined key symbols. As one of the thumb operational side keys is being pressed for a key definition change, symbols of the row keys on the motion monitoring display are programmed to represent the change accordingly. The row 254 symbols are changed from "1 2 3 4 5 6 7 8 9 0 - = \" to " ! @ # $ % ^ & * ( ) _ + |" after a single pressing or clicking of the "Shf" key of 252, and changed to "F1 F2 F3 F4 F5 F6 F7 F8 F9 F10 F11 F12 F13" after a double actuation of the same "Shf" key. The motion detection and monitoring functions as defined in the first embodiment in FIG. 2 through FIG. 5 are applied to the new structure 250.

The combined features of the single hand operation key arrangement and the motion detection with monitoring visual aid function allow user in an easy operational seated position and further reduce motions required to perform manual computer data entry.

From the above description, it will be apparent that the invention disclosed herein provides a novel and advantageous apparatus for computer data entry operations. Those skilled in the art will recognize that the invention may be modified and varied over a great range of applications, but without departing from the spirit or essential characteristics thereof. Accordingly, the scope of the present invention is not limited by any of the specific examples given.

What is claimed is:

1. A keyboard apparatus for data entry to a computer or data processor, said keyboard apparatus comprising:

a keyboard includes a case, an assembly of character keys having a keypad and key caps with designated symbols and organized in a preset keypad layout pattern, a controller circuit including codes and encodement means for generating key stroke signals and coded data in response to manual operator actuation of said keys for data entry to the computer;

at least one data interface interconnecting the keyboard and the computer;

means for monitoring of hand motion including lateral motion and position of the operator's fingers on top of said keys and each individual key cap determines the operator's finger position related to each key cap and decodes it by detecting a change in field intensity in a field path to indicate which key it is, said monitoring means including means for indicating of said hand motion and position relative to a top surface of said keys for assisting of the operator to locate said keys before manual actuation.

2. A keyboard apparatus of claim 1, wherein said monitoring means further includes means for displaying a map of said hand motion before and after manual actuation of said keys for providing a data entry visual aid, said map also includes a diagram of said keypad layout pattern.

3. A keyboard apparatus of claim 1, further comprises means of motion detection for sensing of said hand motion, said motion detection means includes at least one sensing element for use to sense said hand motion and to form electrical signals corresponding to said hand motion.

4. A keyboard apparatus of claim 3, wherein said motion detection means further includes means of adjustment for sensitivity of sensing with said sensing element.

5. A keyboard apparatus of claim 3, wherein said sensing element includes at least one device selected from the group of containing capacitive, optical, magnetic, thermal, inductive, or pressure sensing devices.

6. A keyboard apparatus of claim 3, wherein said sensing element includes at least one photo diode.

7. A keyboard apparatus of claim 1, wherein said monitoring means further comprises at least one object scanning device for providing image information of said hand motion.

8. A keyboard apparatus of claim 7, wherein said object scanning device includes a camera.

9. A keyboard apparatus of claim 2, wherein said displaying means further includes means for generating a graphic representation of said hand motion including said keypad layout pattern and said designated symbols for said keys on a computer's display screen for causing substantially reduction of repetitive actions required by the operator to move focus between the keys and the screen, whereby the operator can operate the keyboard in a more relaxing seated position.

10. A keyboard apparatus of claim 9, wherein said graphic representation further includes graphics of marked or colored key caps for identifying said operator hand motion on top surface of individual said keys.

11. A keyboard apparatus of claim 10, wherein said graphic representation further includes means for identification for action finger positions for locating of said marked or colored key caps close to the top edge of the keyboard.

12. A keyboard apparatus of claim 11, wherein said graphic representation is updated according to predetermined time intervals and providing an interactive monitoring display.

13. A keyboard apparatus for data entry to a computer or data processor, said keyboard apparatus comprising:

a keyboard includes a case, an assembly of character keys having a keypad and key caps with designated symbols and organized in a preset keypad layout pattern, a controller circuit including codes and encodement means for generating key stroke signals and coded data in response to manual operator actuation of said keys for data entry to the computer;

at least one data interface interconnecting the keyboard and the computer;

means for monitoring of hand motion including lateral motion and position of the operator's fingers on top of said keys, said monitoring means including means for indicating of said hand motion and position relative to a top surface of said keys for assisting of the operator to locate said keys before manual actuation;

means of motion detection for sensing of hand motion, said motion detection means includes at least one sensing element for use to sense said hand motion and to form electrical signals corresponding to said hand motion; and wherein said sensing element is located within individual key cap of said keys and comprises means for detecting a change of light field intensity in a field path between said keys and the operators fingers to generate corresponding signals to said hand motion.

14. A method of operating a computer keyboard or apparatus with keys for data or function entry comprising of the steps of:
  (a) sensing information for representation of position and proximity including motion of operator fingers on top of said keys;
  (b) translating and determining finger position information related to each key cap and decoding it to know which key it is to form signals for hand motion monitoring;
  (c) generating a visual aid display for said hand motion monitoring with graphic representation on a visual display screen;
  (d) updating said visual aid display in predetermined time intervals for an interactive graphic presentation of said hand motion monitoring and including an associated diagram of a keypad layout of said keyboard with defined characters for said keys.

15. The method of claim 14, wherein step (a) comprises of the step of detecting field intensity change of a sensing path which is between individual said keys to the location of operator's hands on top of said keys.

16. The method of claim 14, wherein step (b) comprises of the step of translating and processing a first set of codes for normal keyboard data entry and a second set of codes for said motion monitoring.

17. The method of claim 14, wherein step (c) comprises of the step of relocating said visual aid display to a window of the computer display screen.

18. A keyboard apparatus of claim 3, further includes means of encoding a set of scan code for said electricl signals corresponding to said hand motion related to individual keys.

* * * * *